Patented Feb. 15, 1944

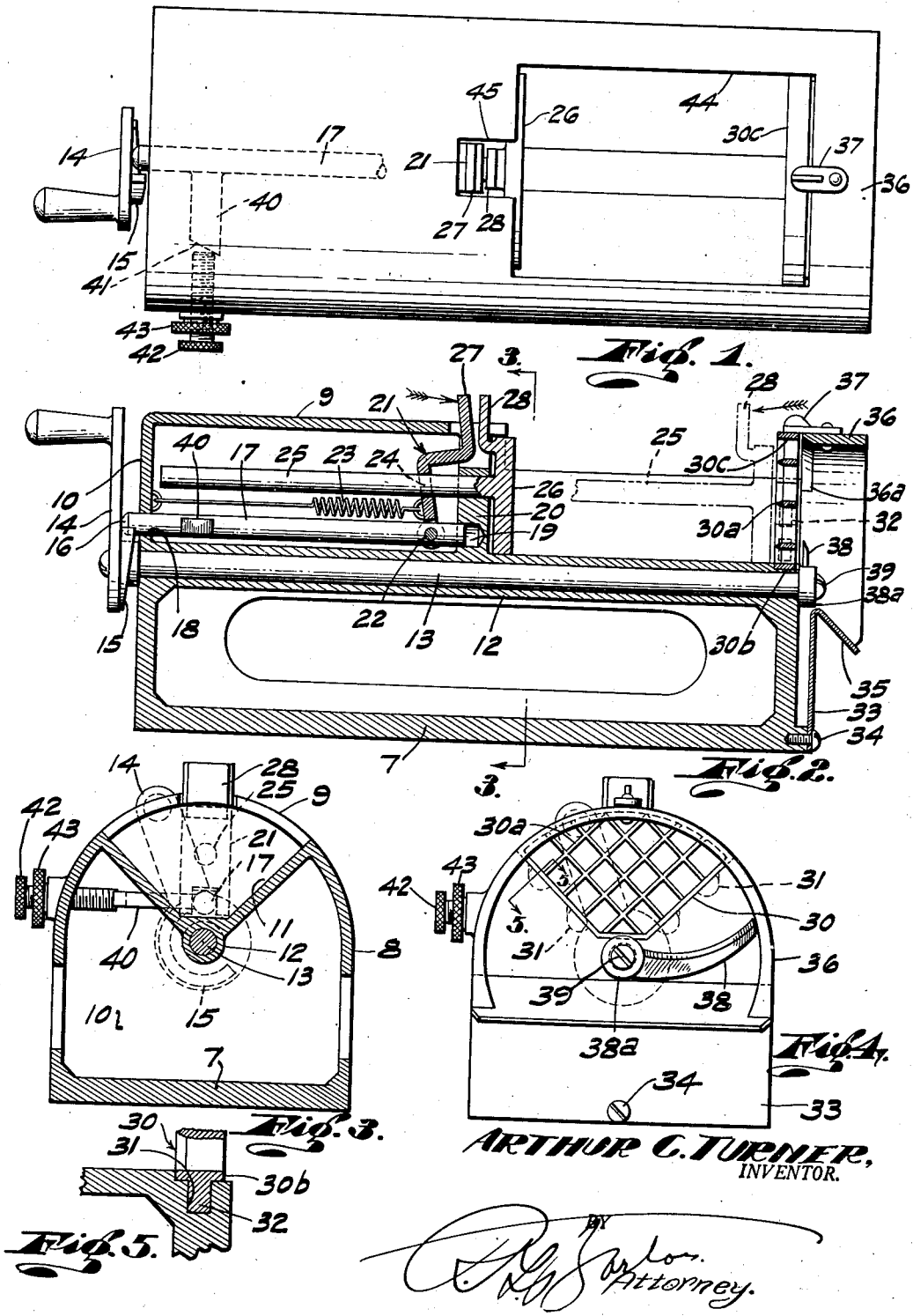

2,341,582

UNITED STATES PATENT OFFICE 2,341,582

MACHINE FOR CUTTING EDIBLES

Arthur C. Turner, Los Angeles, Calif., assignor of one-half to Joseph William O'Brien, Los Angeles, Calif.

Application February 16, 1943, Serial No. 476,127

9 Claims. (Cl. 146—78)

This invention relates to a machine for cutting edible substances.

Among the objects of the invention are: to provide a simplified means for imparting a continuous but intermittently operative movement to a slicing knife; to provide a superior adjustable means for advancing a follower in a step-by-step fashion to move the substance being sliced toward a slicing knife; to reduce the number of parts used in prior devices of the kind described; to provide an improved mechanical slicing device which will operate in a smooth, noiseless manner; and to provide improved means to restore to its retracted position the follower means which advances the substance being sliced toward the slicing knife.

A more specific object of the invention is to include a silent, toothless ratchet in the means for advancing the food follower in a step-by-step fashion.

Still another object is to provide improved means for securely mounting a dicing grill in its operative position and whereby said grill may be quickly and easily removed preparatory to replacing it with another grill having dicing apertures of a different size.

Other objects, advantages and features of invention will hereinafter appear.

Referring to the accompanying drawing, which illustrates what is at present deemed to be a preferred embodiment of the invention, Fig. 1 is a plan view of the complete device, some concealed parts being shown in dotted lines.

Fig. 2 is a longitudinal mid section thereof, dotted lines indicating the advanced position of the follower.

Fig. 3 is a cross section on line 3—3 of Fig. 2.

Fig. 4 is an elevation looking at the delivery end of the device.

Fig. 5 is a fragmentary sectional detail on line 5—5 of Fig. 4, illustrating a portion of the means for removably retaining the dicing grill in its operative position.

Referring in detail to the drawing, the casing includes an elongated, rectangular base portion 7 from each long side of which upstands a wall 8 the upper portion of which is shown incurved, these walls meeting in an integral manner throughout the front portion of the device to form an arcuate housing 9 having a front end wall 10. Throughout the back portion of the device extends a trough-shaped bed plate 11 each side of which is joined along its upper edge with the adjacent portion of the wall 8 at that side of the device, leaving an unobstructed space above said bed plate to permit the substance to be diced to be placed upon said bed plate.

Centrally of the casing as viewed in cross section there extends from end to end thereof a tubular bearing member 12 affording a bearing for a rotatable shaft 13 to the front end of which is secured a handle or crank 14 the inner portion of which carries an arcuate cam 15. This cam extends through an arc of about 180 degrees and is arranged to act upon the rounded front end 16 of a reciprocatory rod 17, this rod having a front bearing at 18 in an aperture in the front wall 10 of the housing and having a rear bearing in a socket 19 provided in a thick wall 20 with which the mid-length portion of the device is provided.

An upstanding toothless pawl 21 has a bifurcated, apertured lower end whereby it is pivoted at 22 to the rear end portion of the rod 17, a coiled tension spring 23 operating between said pawl and the front end of the housing yieldingly to maintain said pawl in its retracted position. Said pawl is of considerable breadth and has through it a hole 24 with straight, parallel upper and lower sides (considered from front to rear), which are distant from each other a space slightly greater than the diameter of the follower stem 25 which passes through said hole, hence the operation of said pawl which results from the rotation of the crank 14 will advance said stem in a step-by-step fashion together with the follower head 26 of which it forms a part.

The pawl 21 is shown angularly shaped in relation to its length, thus providing it with a backwardly offset top portion 27 to be utilized by the hand of the operator to retract the pawl by the hand of the operator to release it preparatory to moving the follower back to its retracted position. Also the follower head 26 is furnished with an upwardly projecting finger 28 operable for retracting the follower from the dotted line to the full line position shown in Fig. 1.

The dicing grill 30 is of a generally segmental shape so as to fit removably within the rear end portion of the trough-shaped bed plate 11, seats 31 being formed in the bed plate, which are occupied by lugs 32 on the edge portion of said grill. The rear end of the housing has attached to it a cover plate 33, the upper part of this plate fitting under the lower ends of the arc of the rearwardly extending upper part 36 of the main casing, so that a single screw 34 suffices to hold said plate 33 in place. Said plate 33 includes an inclined delivery apron 35.

The grill 30, as shown, includes a plurality of cutting blades 30a which intersect each other at right angles, this grill having a lower rim portion 30b which fits within the bed plate 11 and an upper arcuate rim portion 30c which fits under the arcuate rear casing extension 36. A keeper clip 37 is pivoted to the top of the arcuate wall 36 to latch the dicing grill 30 in its mounted position. The illustrated grill 30 is deemed to be of a desirable type for general use, but it is to be understood a set of interchangeable grills may be provided the cutting blades of which will be variously arranged with a view to cutting strips larger and smaller in cross section. By unscrewing the attaching screw 34 the cover or knife guard plate 33 may be removed to expose the end of the machine for cleaning.

To the rear end of the shaft 13 is secured the radially extending curved blade 38 which is positioned to sweep across the rear face of the grill 30 to complete the dicing operation upon whatever substance is being fed through said grill. This blade is shown having a hub or shank 38a through which extends an attaching screw 39 which is tapped into the end of the shaft 13.

In order to regulate the length of each stroke imparted to the rod 17, said rod is provided with a radial lug 40 having a beveled end face 41 with which cooperates a manually operable regulating screw 42 having a screwthreaded connection with the adjacent part of the housing, said screw being held in its adjusted position by a lock nut 43. In Fig. 1 this screw is shown adjusted to permit nearly the maximum length of reciprocation of the rod 17, inward adjustment of the screw from this position lessening the reciprocatory movement of said rod. The spring 23 functions not only to retract the pawl 21 automatically but also to retract the rod 17 each time the latter has been acted upon by the cam 15. Whenever the spring retracts the pawl it produces a binding or gripping action thereof upon the follower stem in the upper and lower portions of the hole through the pawl, one binding point being located at the front edge of the upper part of the hole and the other at the rear edge of the lower portion of the hole.

The construction of the casing which has been described provides a large opening 44 in the rear top portion of the casing through which to insert the substance to be cut up, this opening having a forward extension 45 upwardly through which project the manually operable pawl portion 27 and follower finger 28, the arcuate rear portion 36 of the housing having within its front part a segmental chamfer 36a which clears the way for the sliced material to exit.

The rod 17 is kept from rotational displacement by the toothless pawl 21 and follower stem 25 which passes through said pawl, so that the stop lug 40 is thus maintained in an operative relation to the stop screw 42.

The cross wall 20 through which slidably extends the follower stem 25 is of a sufficient thickness to stabilize the movements of said stem, the follower as a whole offering a sufficient amount of frictional resistance to its movement to insure that no retractive movement thereof will take place when the spring 23 (which is attached to the pawl between its pivot and the follower stem 25) moves the pawl forwardly so as to take a new hold upon said stem.

In the operation of the device, after the screw 42 has been adjusted to regulate as desired the length of each step-by-step advance of the follower 26, and a potato or other edible article to be diced has been placed upon the bed plate 11 with the follower 26 in its retracted position, the operator will start turning the crank 14 in the clockwise direction. This will cause the cam 15 to act upon the convex end 16 of the rod 17 to move the latter during about a half-way round swing of the crank, during which movement of the rod the toothless pawl 21 attached thereto will grip the follower stem 25 and advance the latter together with its head 26 a step forward, thus feeding the edible substance a corresponding distance toward the slitting knives of the grill 30. As soon as the cam 15 clears the end of the rod 17 the spring 23 will restore said stem 17 and pawl 21 to their retracted positions, shown in Fig. 2. The knife 38 attached to the rear end of shaft 13 is properly positioned in relation to said shaft to cause its cutting operation to take place during the idle portion of the travel of the cam 15. The cam 15 and rod 17 cooperate to form a ratchet device to prevent reverse rotation of the crank 14.

When a series of slicing operations has been completed the operator will hold the pawl 21 in the released position by pressing against its finger 27 in the direction indicated by the arrow in Fig. 2, thereby permitting him to use the finger 28 of the follower to retract the latter from the dotted line to the full line position of Fig. 2.

When it is desired to perform only slicing operations upon the material passed through the machine the dicing grill may be removed, and the crank operated in the usual manner.

It should be understood that the present disclosure is for the purpose of illustration only and that this invention includes all modifications and equivalents which fall within the scope of the subject matter claimed.

What is claimed is:

1. In a device of the kind described, in combination, a support including a bed plate to support substances to be sliced, a follower mounted upon said support to feed said substances along said bed plate to a cutter, said follower having a stem, a reciprocatory rod mounted upon said support adjacent to said stem, a pawl operatively connecting said rod with said stem to impart a step-by-step advance to the latter when said rod is reciprocated, a spring acting between said support and rod to retract the latter, said rod carrying a lug which projects radially therefrom and has a beveled outer end, an adjustable stop member carried by said support and engageable with different parts of said beveled outer end of said lug to regulate the distance which said spring retracts said stem, and manually operable means mounted upon said support to move said rod forward to a predetermined point after each retraction thereof by said spring.

2. The subject matter of claim 1, and said manually operable means including a cam which intermittently engages said rod.

3. In a device of the kind described, in combination, a support including a bed plate to support substances to be sliced, a follower mounted upon said support to feed said substances along said bed plate to a cutter, said follower having a stem, a reciprocatory rod mounted upon said support adjacent to said stem, a pawl operatively connecting said rod with said stem to impart a step-by-step advance to the latter when said rod is reciprocated, a spring acting between said support and rod to retract the latter, a part of said rod being furnished with a face which extends at an inclination to the axis of the rod, an adjustable stop member carried by said support and engageable with different parts of said face to regulate the distance which said spring retracts said stem, and manually operable means mounted upon said support to move said rod forward to a predetermined point after each retraction thereof by said spring.

4. In a device of the kind described, a support including an elongated casing having a base supporting it in a horizontally extending position, said casing including a bed plate located in the rear part thereof and an upstanding crosswall located at the front end of said bed plate, a follower having a head to travel along said bed plate and a stem passing slidably through said crosswall, a horizontally extending longitudinally reciprocating rod mounted upon said support subjacent to said stem and extending substantially parallel therewith, a rotatable shaft mounted upon said support in a subjacent substantially parallel relation to said rod, a slicing knife carried radially by said shaft in a position intermittently to remove slices from a substance moved along said bed plate by said follower, a crank carried by said shaft for the rotation thereof, a cam carried by said crank in a position to impart a rearward movement to said rod during the intervals between the intermittent slicing operations of said knife, a pawl acting between said rod and stem to impart a forward movement to the latter each time said cam acts upon said stem, a spring connected with said support and rod to retract said rod after each actuation of the latter by said cam, and a stop carried by said support to limit the retractive action of said spring upon said rod.

5. The subject matter of claim 4, and said pawl being pivoted to said rod and said spring being connected to said pawl adjacent to said rod whereby simultaneously to retract both said pawl and said rod.

6. The subject matter of claim 4, and the front end of said rod having a bearing support in the front portion of the casing, there being a socket extending into the front face of said crosswall, the rear end portion of said rod having a bearing in said socket.

7. The subject matter of claim 1, and said follower stem and reciprocatory rod being substantially parallel to each other, said stem passing through a hole through said pawl and said pawl being pivotally attached to said rod, thereby preventing rotational displacement of said lug of said rod in relation to said adjustable stop member.

8. The subject matter of claim 1, and said follower stem and reciprocatory rod being substantially parallel to each other, said stem passing through a hole through said pawl and said pawl having a bifurcated lower end which passes astride and is pivotally connected to said rod, thereby preventing rotational displacement of said lug of said rod in relation to said adjustable stop member.

9. The subject matter of claim 1, and said follower stem and reciprocatory rod being substantially parallel to each other, said pawl being at one end pivoted to said rod, there being through said pawl a hole of considerably greater diameter than said stem, said stem passing through said hole, the lower rear edge and upper front edge of the hole binding upon said stem at each rearward reciprocation of said rod.

ARTHUR C. TURNER.